(12) United States Patent
Lee

(10) Patent No.: US 7,604,112 B1
(45) Date of Patent: Oct. 20, 2009

(54) BEADING FOR A CONVEYOR BELT

(75) Inventor: Rick Lee, Danville, KY (US)

(73) Assignee: Transnorm System, Inc., Arlington, TX (US)

( * ) Notice: Subject to any disclaimer, the term of this patent is extended or adjusted under 35 U.S.C. 154(b) by 0 days.

(21) Appl. No.: 12/215,848

(22) Filed: Jun. 30, 2008

(51) Int. Cl.
*B65G 21/16* (2006.01)

(52) U.S. Cl. .................................. 198/831; 198/844.1

(58) Field of Classification Search ................ 198/831, 198/844.1, 846, 847; 474/230, 237, 242, 474/252, 265
See application file for complete search history.

(56) References Cited

U.S. PATENT DOCUMENTS

| | | | |
|---|---|---|---|
| 2,446,890 A | 8/1948 | Stadelman | |
| 2,619,222 A | 11/1952 | Przybylski | |
| 3,217,861 A | 11/1965 | Daniluk et al. | |
| 3,901,379 A | 8/1975 | Bruhm | |
| 4,202,443 A | 5/1980 | Buhrer | |
| 4,955,466 A | 9/1990 | Almes et al. | |
| 5,203,800 A | 4/1993 | Meredith | |
| 5,332,083 A | 7/1994 | Axmann | |
| 5,360,102 A | 11/1994 | Schoning | |
| 5,394,977 A | 3/1995 | Cline | |
| 5,667,058 A * | 9/1997 | Bonnet | 198/831 |
| 5,860,512 A | 1/1999 | Gianvito et al. | |
| 5,992,615 A | 11/1999 | Muchalov | |
| 6,216,851 B1 | 4/2001 | Mitas et al. | |
| 6,447,648 B1 | 9/2002 | Slagowski et al. | |
| 6,564,931 B1 * | 5/2003 | Edelmann | 198/831 |
| 6,834,760 B2 * | 12/2004 | Yamazaki | 198/831 |
| 7,004,310 B2 | 2/2006 | Axmann | |
| 7,014,036 B2 | 3/2006 | Robinson et al. | |
| 7,131,530 B2 | 11/2006 | Lee et al. | |
| 7,201,688 B2 | 4/2007 | Wu | |
| 2004/0035685 A1 | 2/2004 | Fujiwara et al. | |
| 2004/0079622 A1 * | 4/2004 | Yamazaki | 198/831 |
| 2004/0129388 A1 | 7/2004 | Brazil | |
| 2005/0109586 A1 * | 5/2005 | Schoendienst | 198/801 |
| 2006/0081446 A1 | 4/2006 | Lee | |
| 2007/0155566 A1 | 7/2007 | Wu | |

* cited by examiner

*Primary Examiner*—James R Bidwell
(74) *Attorney, Agent, or Firm*—Kenneth F. Pearce

(57) ABSTRACT

The present invention is related to interlockers or beadings that are attached to the outer edges of conveyor belts. Interlockers and/or beadings are reinforced with aramid fibers to improve their durability.

20 Claims, 7 Drawing Sheets

BEADING FOR A CONVEYOR BELT

BACKGROUND OF THE INVENTION

1. Field of the Invention

Among other things, the present invention is related to interlockers or beadings attached to the outer edges of conveyor belts. The interlockers or beadings are reinforced with aramid fibers to improve their durability. Interlockers or beadings are composed of from about 1% w/w to about 3% w/w aramid fibers.

2. Description of the Previous Art

Any discussion of references cited in this Description of the Previous Art merely summarizes the disclosures of the cited references and Applicant makes no admission that any cited reference or portion thereof is relevant prior art. Applicant reserves the right to challenge the accuracy, relevancy and veracity of the cited references.

1) U.S. Pat. No. 4,955,466—Almes, et al., owned Applicant. Almes discloses reinforcing member 3 having a convex beading 4 positioned between rolling elements 9 and 10. Beading 4 includes symmetrical lips 5a and 5b. The '466 patent does not teach or suggest a gear integrally formed on either lip 5a or lip 5b. Further, the '466 patent does not teach or suggest the chemical composition of a conveyor belt's interlocker or rider.

2) U.S. Pat. No. 5,360,102—Schoning is also owned by Applicant. FIGS. 1 and 2 disclose two bead marginal portions 9 with structures identical to the reinforcing members structures enabled in U.S. Pat. No. 4,955,466—Almes, et al. Schoning does not teach or suggest a gear integrally formed with marginal portions 9. Further, the '466 patent does not teach or suggest the chemical composition of a conveyor belt's interlocker or rider.

3) U.S. Pat. No. 2,446,890—Stadelman enables a lateral bend power driven conveyor. The '890 patent does not teach or suggest the chemical composition of a conveyor belt's interlocker or rider.

4) U.S. Pat. No. 2,619,222—Przybylski enables a centering and take-up means for belt conveyors. The '222 patent does not teach or suggest a belt interlocker or rider having a lip or leg with a gear formed integrally thereon. Further, Przybylski does not teach or suggest the chemical composition of a conveyor belt's interlocker or rider.

5) U.S. Pat. No. 3,217,861—Daniluk, et al. enables a curved conveyor belt. The '861 patent does not teach or suggest a belt interlocker or rider having a lip or leg with a gear formed integrally thereon. Further, Daniluk does not teach or suggest the chemical composition of a conveyor belt's interlocker or rider.

6) U.S. Pat. No. 3,901,379—Bruhm enables an angular guidance for a conveyor belt system. Bruhm's elastic shoulder 10 is attached to belt 1 with rivet 16. Shoulder 10 rides against rollers 12 and 14. The '379 does not teach or suggest a lip or a leg attached to belt 1 that extends from shoulder 10 to pass though the opening between rollers 12 and 14 while shoulder 10 rides simultaneously against rollers 12 and 14. Further, Bruhm does not teach or suggest the chemical composition of a conveyor belt's interlocker or rider.

7) U.S. Pat. No. 4,202,443—Buhrer describes a conveyor belt curve. The '443 patent enables tension springs 8 to secure belt 1 to the conveyor. Buhrer does not teach or suggest a belt interlocker or rider having a lip or a leg with a gear formed integrally thereon. Further, the '443 patent does not teach or suggest the chemical composition of a conveyor belt's interlocker or rider.

8) U.S. Pat. No. 5,394,977—Cline enables an apparatus and method for use in replacing conveyor belts. A U-shaped member 84 is secured to the outer edge portion 6 using suitable means, such as the adhesive or rivets, and provides shoulder portions 86 and 88 which are contacted by the cylindrical surfaces 48 and 64. The operation of the endless conveyor belt 4 produces a radially inwardly directed force but the cylindrical surfaces 48 and 64 bear against the shoulders 86 and 88 to keep the endless conveyor belt 4 moving in the desired path. Cline does not teach or suggest a belt interlocker or rider having a lip or a leg with a gear formed integrally thereon where the lip passes through the opening between cylindrical surfaces 48 and 64. Further, the '977 patent does not teach or suggest the chemical composition of a conveyor belt's interlocker or rider.

9) U.S. Pat. No. 5,332,083—Axmann describes a curved belt conveyor. Rollers 40 and 41 press against the elevation 32 of belt 1. Axmann does not teach or suggest a belt interlocker or rider having a lip or a leg with a gear formed integrally thereon. Further, the '083 patent does not teach or suggest the chemical composition of a conveyor belt's interlocker or rider.

10) U.S. Pat. No. 5,203,800—Meredith teaches a treadmill with a peripheral belt support. The Meredith profile is ideally built up from the edges of the endless belt 50, by attaching a multi-stranded cable core 40 made from stainless steel or other suitable material, with a fabric reinforcing strip 42. A tubular plastic sleeve 44 made from a strong and flexible plastic, such as nylon is then bonded over the prepared edge of the endless belt 50 using a vulcanizing process to form a continuous, seamless load-bearing profile to engage the support rollers 14. The '800 patent does not teach or suggest a belt interlocker or rider having a lip or a leg with a gear formed integrally thereon. Further, Meredith does not teach or suggest the chemical composition of a conveyor belt's interlocker or rider.

11) U.S. Pat. No. 5,860,512—Gianvito, et al. enables a sliding belt turn conveyor. Endless belt 12 is retained in the curved path by restraining devices 40, 41, and 42. Fasteners 55a secure wheel assemblies 46 to the edge of belt 12. Wheel 54 is mounted to a wheel support plate 47 and to the belt by fastener 55a. The wheel 54 has a plastic tire 54b mounted on a bushing 54a. Fastener 55a extends through belt 12, wheel support plate 47, and bushing 54a and is secured thereto by a nut 55b. Wheel assembly 46 extends generally perpendicular from a lower surface 12b of the endless belt so that tires 54b engage upper and lower vertical bearing surfaces 40a and 40b of bearing member 40 which restrains lateral movement of belt 12. The '512 patent does not teach or suggest a belt interlocker or rider having a lip or a leg with a gear formed integrally thereon. Further, Gianvito does not teach or suggest the chemical composition of a conveyor belt's interlocker or rider.

12) U.S. Pat. No. 5,992,615—Muchalov enables a curved conveyor section. The '615 patent does not teach or suggest the chemical composition of a conveyor belt's interlocker or rider.

13) U.S. Pat. No. 6,216,851—Mitas, et al. discloses a rivet belt fastener. The Mitas Patent does not teach or suggest a belt interlocker or rider having a lip or a leg with a gear formed integrally thereon. Further, Mitas does not teach or suggest the chemical composition of a conveyor belt's interlocker or rider.

14) U.S. Pat. No. 6,447,648—Slagowski, et al. enables an anisotropic reinforced ribbon-cast blanket for extended nip press. Column 3, lines 45-56, of Slagowski reads, "The urethane-fiber mix is thus applied as a continuous ribbon. The width and thickness of the ribbon will depend on how fast the material is flowing. The ribbon may be from ¼ inch to 2 inches wide. The thickness of the applied mixture may be from 30/1000 inch to 150/1000 inches. The length of the fibers is from 1/16 inch to 2 inches. It is desirable that a high aspect ration between the length and the diameter of the fibers be maintained. Various types of fibers may be employed, for example glass, graphite, KEVLAR (a trademark of Du Pont Co. for an aramid fiber), UHMW ("ultra-high molecular weight") polyethylene, carbon fiber, or other reinforcing material." Among other things, the '648 patent does not disclose any percentage of polyparaphenylene terphthalamide embedded in a polyether-based thermoplastic polyurethane or a polyurethane-ararnid fiber combination having a Shore A hardness of from about 85 to about 90. Further, Slagowski does not teach the physical structure of an interlocker or rider.

15) U.S. Pat. No. 6,564,931 B1—Edelmann enables a belt conveyor. Among other things, Edelmann requires a toothed ring 6 for each carrying roller 2. Carrying roller 2 has journal 8 that is connected to the drive device. The '931 toothed belt 7 is fixed on conveying belt 1, and importantly, is a constituent part of a toothed belt component 9. Counterpressure 10 presses toothed belt component 9 onto the conveying belt 1. The free ends of the essentially U-shaped toothed belt component 9 are configured as a bead 11, which produces a bead ridge along the conveying belt border. Bead 11 rides against guide rollers 12. Guide rollers 12 are fastened on angled retaining arms 13 such that they act on the toothed-belt component 9 and/or on the bead 11 by way of inclined running surfaces. Edelmann does not teach or suggest a belt interlocker or rider having a lip or a leg with a gear formed integrally thereon where the lip passes through the opening between guide rollers 12. Further, the '931 patent does not teach or suggest the chemical composition of a conveyor belt's interlocker or rider.

16) U.S. Pat. No. 7,004,310—Axmann enables a belt band conveyor having separate guide shoes. Axmann discloses a plurality of guide shoes 35 attached to a curved conveyor belt 21. Axmann does not teach interlockers or riders attached to the outward margin of the conveyor belt. Further, the '310 patent does not teach or suggest the chemical composition of a conveyor belt's interlocker or rider.

17) U.S. Pat. No. 7,014,036—Robinson, et al. enables a cathode linear conveyor assembly. Column 4, lines 28-38, of Robinson reads, "In a specific embodiment the timing belt 12 is fabricated from extruded lengths of polyurethane and may also be laminated with other materials such as steel, Kevlar, carbon or glass fibre for reinforcing. Additionally, the timing belt may be backed with other materials such as nylon to lower friction. Polyurethane is well known in the art as a material for fabricating drive belts and the like and is advantageous in many implementations given the combination of its high tensile strength, low mass, suppleness and the ability to fabricate continuous drive belts of virtually any length and thickness." Among other things, the '036 patent does not disclose any percentage of polyparaphenylene terphthalamide embedded in a polyether-based thermoplastic polyurethane or a polyurethane-aramid fiber combination having a Shore A hardness of from about 85 to about 90. Further, Robinson does not teach the physical structure of an interlocker or rider.

18) U.S. Pat. No. 7,131,530—Lee, et al. enables an interlocker for a conveyor belt and method of utilizing an interlocker for a conveyor belt. Lee does not teach or suggest the chemical composition of a conveyor belt's interlocker or rider.

19) US Patent Application 20040035685—Fujiwara, et al. discloses a curved belt support apparatus. A thick part 220 is formed across the entire outer edge area of the Fujiwara curved belt 200. The thick part 220 is thicker than the rest of the curved belt 200 on both the top and bottom surfaces. Upper inner side surface 221 of the thick part 220 is oriented diagonally upward facing the radial inner edge of the curved belt 200, while the lower inner side surface 222 is oriented diagonally downward facing the radial inner edge of the curved belt 200. The curved conveyor 100 has support apparatuses 300 that support the thick part 220 and prevent it from moving in the direction of the radial inner edge of the curved belt 200.

20) US Published Patent Application 20040129388—Brazil discloses a non-marring tire lever. Brazil teaches a polyurethane coating that surrounds an aramid fiber tire lever. Among other things, the '388 application does not disclose aramid fibers randomly dispersed and embedded in a polyether-based thermoplastic polyurethane, any percentage of polyparaphenylene terphthalamide embedded in a polyether-based thermoplastic polyurethane or a polyurethane-aramid fiber combination having a Shore A hardness of from about 85 to about 90.

21) US Published Patent Application 20060081446—Lee teaches a belt including a flexible rare earth magnetic strip and conveyor. Paragraph 93 discloses the use of a polyurethane belt while Paragraph 86 reads, "In accordance with the present invention, stretch limiting members are preferably created from aramid fibers. Depending upon engineering parameters, such as the load to be carried by belt (100), the aramid fibers can be woven into a strand, ribbon, cord or the like. An example of an aramid fiber includes those fibers sold under the trademark KEVLAR® owned by the E. I. DuPont de Nemours & Company." Lee is limited to aramid fibers woven into a strand, ribbon or cord that is embedded into a polyurethane belt. Among other things, Lee does not does not disclose any percentage of polyparaphenylene terphthalamide embedded in a polyether-based thermoplastic polyurethane or a polyurethane-aramid fiber combination having a Shore A hardness of from about 85 to about 90.

22) US Published Patent Application 20070155566—Wu discloses a power transmission belt. Wu teaches a multi-V-ribbed belt 10 that has an elastomeric main belt body portion 12, a sheave contact portion 14, adhesive rubber 18 and tensile cord 22. Paragraph 26, in part, of Wu reads, "In each of the cases of FIGS. 1-3 shown above, the main belt body portion 12 may be formed of any conventional and/or suitable cured elastomer composition, and may be of the same as or different from that described below in relation to the optional adhesive rubber member 18. Suitable elastomers that may be utilized for this purpose include for example polyurethane elastomers (including as well polyurethane/urea elastomers) . . . " Paragraph 30, in part, reads, "The elastomeric main belt body portion 12 may moreover be loaded with discontinuous fibers as is well known in the art, utilizing materials such as including but not limited to cotton, polyester, fiberglass, aramid and nylon, in such forms as staple or chopped fibers, flock or pulp, in amounts generally employed." Wu does not disclose the physical structure of an interlocker or a rider connected to a conveyor belt. Among other things, Wu does not disclose any percentage of polyparaphenylene terphthalamide embedded in a polyether-based thermoplastic polyurethane or a polyurethane-aramid fiber combination having a Shore A hardness of from about 85 to about 90.

23) U.S. Pat. No. 7,201,688—Wu enables a power transmission belt. The disclosure of the '688 patent is similar to US Published Patent Application 20070155566—Wu. Thus, the relevance to of the '688 patent is similar to that of the '566 Published Patent Application. Among other things, Wu does not disclose any percentage of polyparaphenylene terphthalamide embedded in a polyether-based thermoplastic polyurethane or a polyurethane-aramid fiber combination having a Shore A hardness of from about 85 to about 90.

SUMMARY OF THE INVENTION

Unlike traditional beadings made of thermoplastic polyurethane, the present beading is manufactured of polyurethane reinforced with aramid fibers. In the practice of the present invention, flexible beadings or interlockers can be attached to conveyor belts. The current invention has two legs or lips that extend from the head of the beading or interlocker to create a slot for receiving a portion of the conveyor belt. The belt is pushed into the slot until the belt encounters the stop formed in the head or the transitional body. In accordance with present invention, the beading's head or the interlocker's head and corresponding transitional bodies are distal from the outward edge of the conveyor belt.

In the practice of the current invention, a portion of the belt is sandwiched between the beading's legs and the legs and the belt are attached to each other using stitching or any other manner acceptable in the art. In select embodiments, the interlocker is integrally formed in the general configuration of a clip. As the conveyor belt circulates about the conveyor, holders mounted to the conveyor frame grip the beading's head while allowing the beading's lips to pass through an opening between the holders' rotable bearings. In select embodiments, at least one lip includes a gear integrally formed thereon for meshing with a corresponding gear of the driver or pulley. For this geared embodiment, the meshing of the pulley gear and the lip gear assist the drive in driving the conveyor belt in a forward or a rearward direction.

In accordance with the present invention, the heads, transitional bodies and lips or legs of the interlocker or beading can be integrally formed and composed of a uniform composition. At the same time, the heads, transitional bodies and lips or legs of interlockers or beadings can be manufactured from one or more blends of chemical compounds. For example, the head can be composed of a first blend while the transitional body and legs are composed of a second blend. Additionally, the head can be composed of a first blend, the transitional body can be composed of a second blend and the lips composed of a third blend.

An aspect of the present invention is to provide a thermoplastic polyurethane interlocker or beading that is reinforced with aramid fibers.

Still another aspect of the present invention is to provide a polyether based thermoplastic polyurethane interlocker or beading that is reinforced with aramid fibers.

It is another aspect of the present invention to provide a polyether based thermoplastic polyurethane interlocker or beading having aramid fibers randomly dispersed therein.

Yet another aspect of the present invention is to provide a polyether based thermoplastic polyurethane interlocker or beading having polyparaphenylene terphthalamide randomly dispersed therein.

Still another aspect of the present invention is to provide a flexible interlocker or beading that has a head, transitional body and lips or legs for gripping a portion of the conveyor belt.

Yet still another aspect of the present invention is to provide an interlocker or beading that is composed of from about 1% w/w to about 3% w/w aramid fibers.

It is still another aspect of the present invention to provide an interlocker or beading that includes aramid fibers having diameters from about 10 micrometers to about 14 micrometers.

Still another aspect of the present invention is to provide an interlocker or beading that includes aramid fibers having lengths from about 3 millimeters to about 7 millimeters.

Yet still another aspect of the present invention is to provide a flexible interlocker or flexible beading having increased durability as compared to previous beadings.

It is yet another aspect of the present invention to provide a flexible interlocker or flexible beading having a Shore A hardness of form about 85 to about 90.

Still another aspect of the present invention is to provide a flexible interlocker or beading having a tear strength of at least 2400 Newtons.

Yet still another aspect of the present invention is to provide a flexible interlocker or beading having a tensile strength of at least 30 Newtons per square millimeter.

It is yet another aspect of the present invention to provide a flexible interlocker or beading having a specific gravity of about 1.07 to about 1.11.

An embodiment of the present invention can be described as an interlocker attached to an outer margin of a conveyor belt, comprising: a) a flexible beading integrally formed with a head, a first lip and a second lip such that the head surrounds the outer margin of the conveyor belt, wherein the flexible beading comprises a composition distinct from the conveyor belt's composition, and wherein the flexible beading's composition further comprises: i) from about 97% w/w to about 98% w/w polyether-based thermoplastic polyurethane; ii) from about 1% w/w to about 3% w/w polyparaphenylene terphthalamide fibers randomly dispersed and embedded in the polyether-based thermoplastic polyurethane; iii) a tensile strength of about 30 Newtons per square millimeter or greater; iv) a tear strength of about 2400 Newtons or greater; and v) a Shore A hardness of from about 85 to about 90; and b) at least one of the first lip or the second lip comprising teeth for meshing with a driver.

Another embodiment of the present apparatus can be described as a beading extending outward from an outward arc of a curved conveyor belt, comprising: a) a generally ellipsoidal shaped head; b) a first leg; c) a second leg spaced apart from the first leg; and d) a tapered transitional body, extending between the generally ellipsoidal shaped head and the first leg and the second leg, wherein one or more of the generally ellipsoidal shaped head's, the first leg's, the second leg's or the transitional body's compositions comprises: i) from about 97% w/w to about 98% w/w polyether-based thermoplastic polyurethane; ii) from about 1% w/w to about 3% w/w aramid fibers randomly dispersed and embedded in the polyether-based thermoplastic polyurethane; iii) a Shore A hardness of from about 85 to about 90; and iv) a specific gravity of from about 1.07 to about 1.11.

Yet another embodiment of the present device can be described as a beading attached to an endless loop conveyor belt, comprising: a) a head; b) a first leg; c) a second leg; and d) a transitional body extending between the head and the first leg and the second leg, wherein at least one of the head's, the first leg's, the second leg's or the transitional body's compositions comprises: i) from about 97% w/w to about 98% w/w polyether-based thermoplastic polyurethane; ii) from about 1% w/w to about 3% w/w aramid fibers randomly dispersed and embedded in the polyether-based thermoplastic polyurethane; and iii) a Shore A hardness of from about 85 to about 90.

In still another embodiment, the present invention can be described as a rider attached to a margin of a conveyor belt, comprising: i) from about 97% w/w to about 98% w/w polyether-based thermoplastic polyurethane; ii) from about 1% w/w to about 3% w/w aramid fibers embedded in the polyether-based thermoplastic polyurethane; and iii) a Shore A hardness of from about 85 to about 90.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

FIG. 4A is a perspective of a ring of teeth than can fit over the driver's recess.

FIG. 4B is a top view of the ring of teeth.

DESCRIPTION OF THE PREFERRED EMBODIMENTS

Although the disclosure hereof is detailed to enable those skilled in the art to practice the invention, the embodiments published herein merely exemplify the present invention.

Although the present invention can be practiced with straight conveyors, many of the embodiments are incorporated into conveyor curves. In the most general sense, a frame and its cross members support the curved conveyor belt, pulley, roller and belt holders. For curved conveyors, both the frames and the belts have inward and outward arcs—the respective inward arcs being of a lesser length than their corresponding outward arcs.

In most preferred embodiments, at least one roller is positioned between the outer margins of the frames. The drive unit includes a pulley that is also positioned between the outer margins of the frame. In select embodiments, the pulley will include a recess—the recess being positioned proximate the outward arc of the frame and opposite the inward arc of the frame. A unique feature of the current invention is that a set of teeth can be formed in the pulley's recess or a ring of teeth can be inserted over the pulley's recess. In other select embodiments, the conveyor can also include a second drive unit positioned between the outward and inward arc of the frame.

Belt holders mounted to the frame are located strategically about the outer margins of the conveyor frame. For curved conveyors, in part, the belt holders counteract the radial pulling associated with curved conveyor belts. Among other things, the belt holders include an upper rotable bearing and a lower rotable bearing. There is a passage between the upper rotable bearing and the lower rotable bearing that allows a portion of the conveyor belt and a portion of the conveyor belt's interlocker or beading to ride between the rotable bearings.

The flexible interlocker or beading has a convex or a generally ellipsoidal head that rides against the rotable bearings. The head cannot be pulled through the opening between the upper and lower rotable bearings. In select embodiments, the interlocker or beading includes at least one lip or leg surface that has a set of teeth for meshing with the pulley's teeth. Other embodiments of the beading have a transitional body positioned between the belt interlocker's convex head and the beading's legs. In other words, the legs or lips can pass through the passage between the holder's upper and lower bearings while the convex head and transitional body are prevented from being pulled through the passage between the bearings.

Adjusting the holders and the pulley allows the curved conveyor belt to be gripped tautly. In select embodiments, the meshing of two sets of teeth allows the tautly gripped belt to be driven in either a forward a rearward direction. In some embodiments, a rotable bearing engages the lip having the teeth integrally formed thereon to ensure adequate meshing between the lip's teeth and the pulley's teeth.

Figure 1:
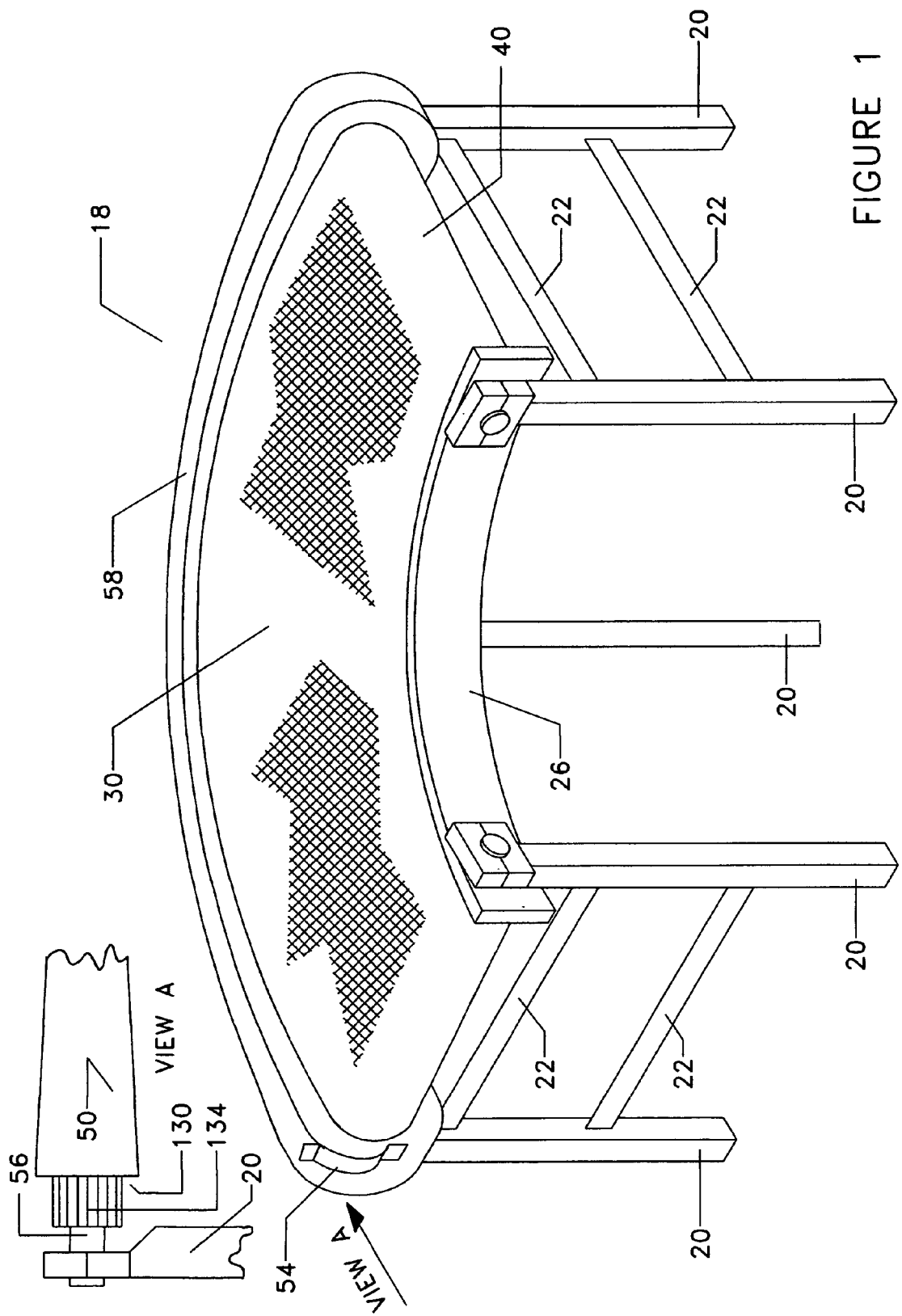
FIG. 1 is a simplistic three-dimensional representation of a conveyor incorporating a interlocker or beading, within the scope of the present invention.
Figure 2:
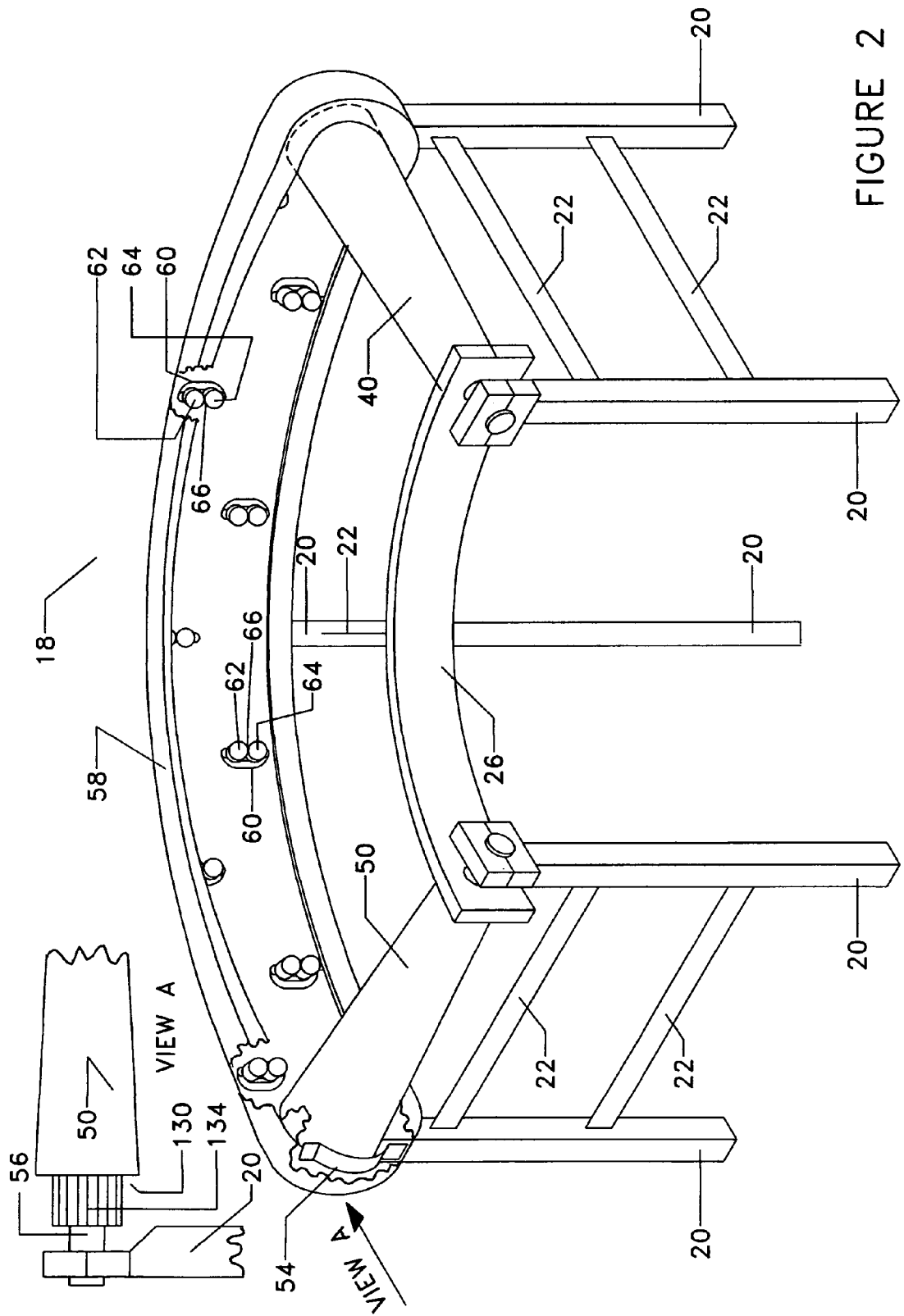
FIG. 2 is the identical view of FIG. 1 with the conveyor belt cut away, including a single drive unit.
Figure 2A:
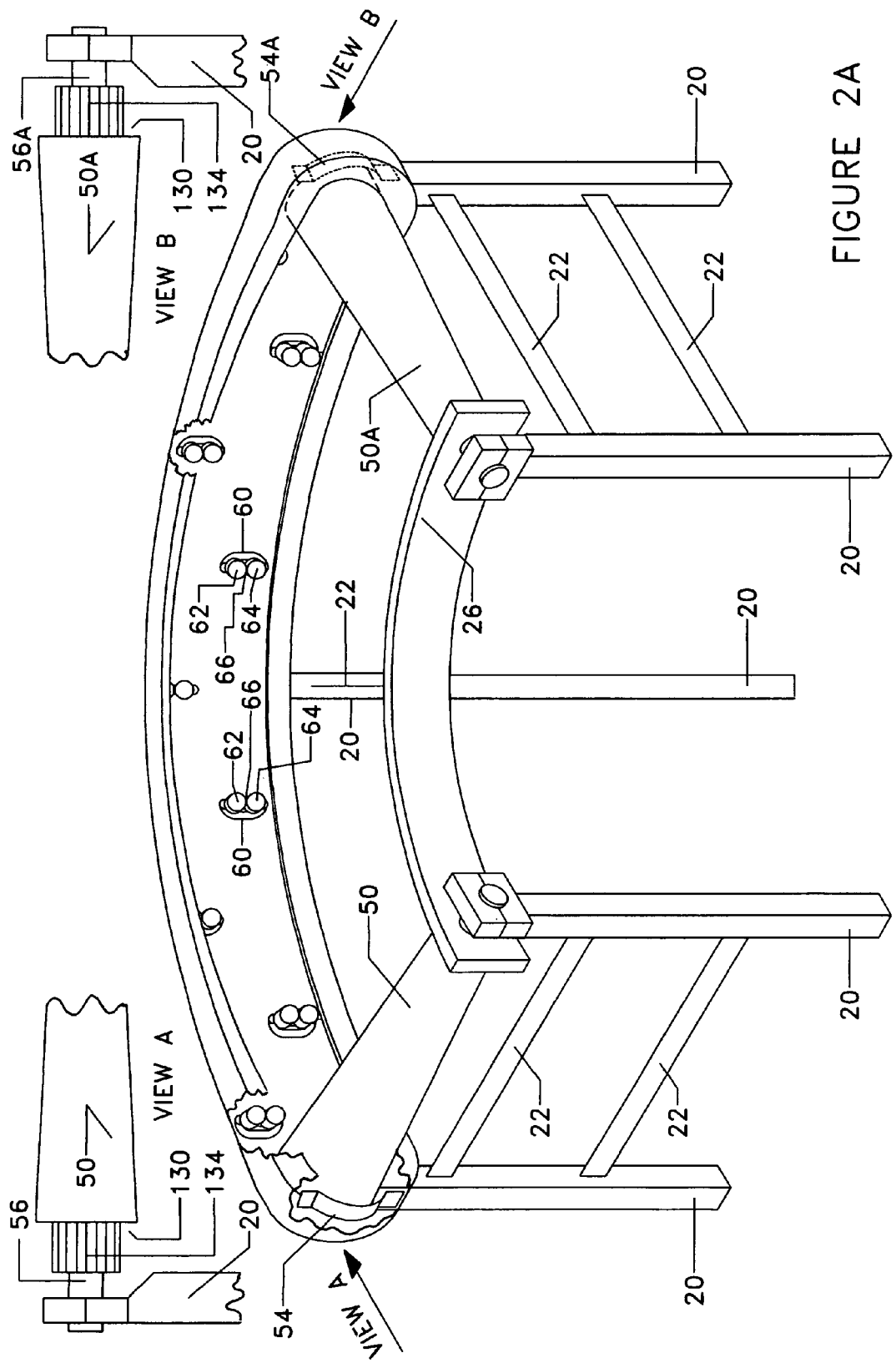
FIG. 2A is also a view of FIG. 1 with the conveyor belt cut away that includes a second drive unit.

Turning now to FIGS. 1, 2 and 2A, a preferred embodiment of a curved conveyor (18) within the scope of the present invention is disclosed. FIG. 1 shows conveyor (18) including conveyor belt (30). In FIGS. 2 and 2A, conveyor belt (30) has been cutaway from conveyor (18). FIG. 2 depicts a conveyor incorporating pulley (50) and roller 40 while FIG. 2A discloses a conveyor utilizing first pulley (50) and second pulley (50A).

As shown in FIGS. 1-2A, curved conveyor (18) has a frame including a plurality of legs (20), cross members (22) and arc members (26). Inward arc of conveyor (18) is of lesser length than outward arc of conveyor (18). Conveyor belt (30) circulates in an endless loop about roller (40) and pulley (50) or pulley (50) and pulley (50A). Drivers (50) and (50A) are tapered from their outward margins toward their inward margins, with the greater circumferences located along their outward borders proximate the outward arc of conveyor (18).

As shown in View A, along with being joined to hollow shaft (56), pulley (50) circumscribes the majority of hollow shaft (56). Similarly, in View B, pulley (50A) circumscribes hollow shaft (56A) and is joined to hollow shaft (56A). Hollow shaft (56) can be coupled to a drive shaft (not shown) and a source of power for driving pulley (50) while hollow shaft (56A) can be coupled to a second drive shaft (not shown). Conveyor (18) can also be provided with finger guards (54) and (54A) and holder cover (58).

As best shown in FIGS. 2 and 2A, holders (60) are mounted to outer arc member (26) of conveyor (18). Holders (60) are mounted to hold both the load carrying side of belt (30) and the non-carrying side of endless loop belt (30). Each holder (60) includes upper rotable bearing (62) and lower rotable bearing (64). Upper rotable bearing (62) and lower rotable bearing (64) are positioned to create a belt passage (66) between upper rotable bearing (62) and lower rotable bearing (64).

Figure 3:
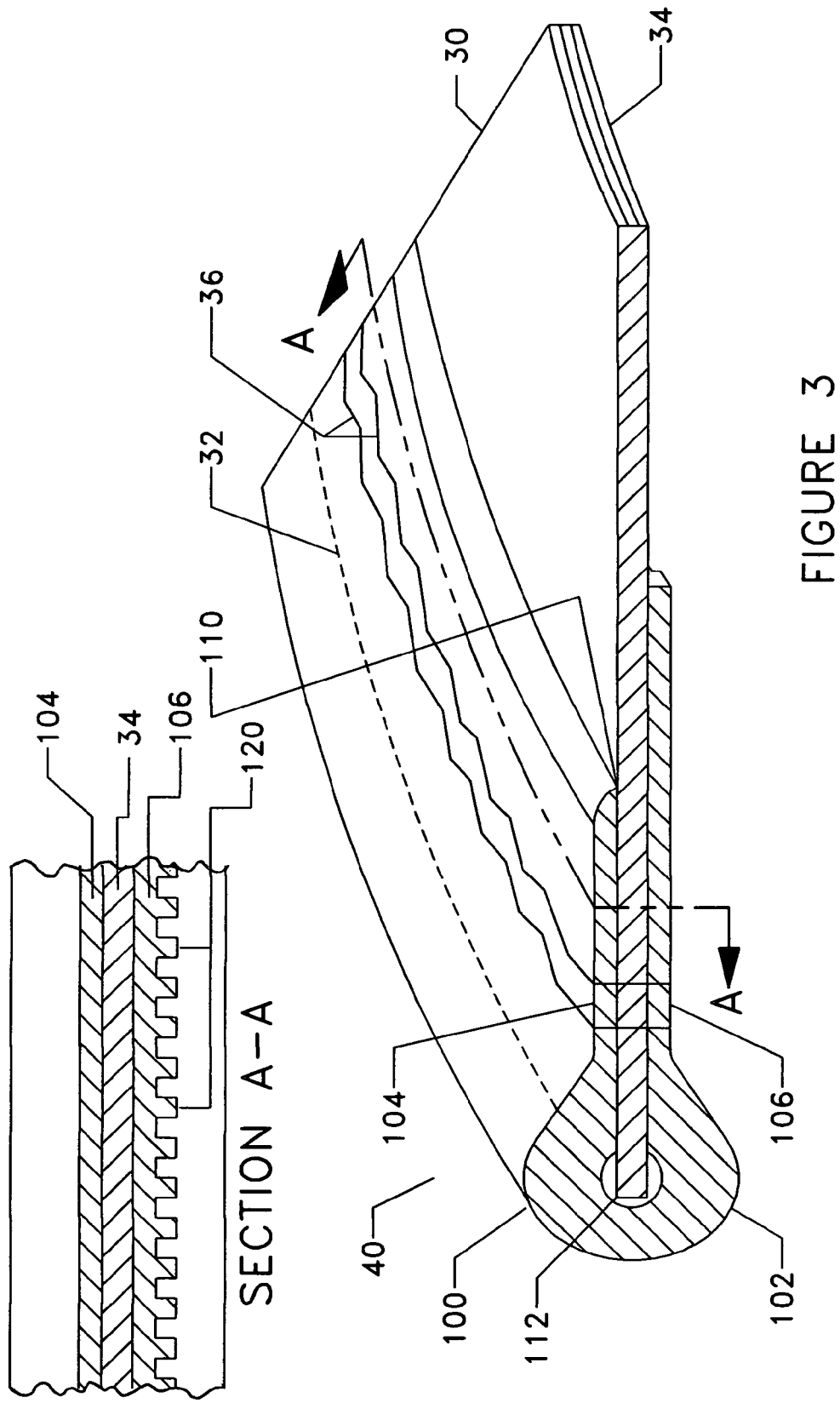
FIG. 3 is a cross-sectional view an embodiment of an interlocker and a conveyor belt, within the scope of the present invention.

FIG. 3 is a cross-section of conveyor belt (30) showing flexible interlocker (100) receiving a portion of belt (30). Conveyor belt (30) has outward arc (32) and inward arc (34). Interlocker (100) is connected to belt (30) with threads or stitches (36). However, other means for connecting interlocker (100) and belt (30) can include rivets, internal grippers molded into the flexible interlocker, adhesives or any combination thereof.

In one embodiment of the current invention, flexible rider (100) can be described as an integrally formed clip. Extending from generally ellipsoidal shaped or convex head (102) is lip or leg (104) and lip or leg (106). In select embodiments, clip (100) can be provided with transitional body (108) (shown in FIG. 4) formed between head (102) and legs (104) and (106). Lips (104) and (106) are dimensioned to ride through passage (66) between upper rotable bearing (62) and lower rotable bearing (64) while head (102) is of large enough dimension to be prevented from riding through passage (66). Generally ellipsoidal shaped head (102) rides against upper rotable bearing (62) and lower rotable bearing (64). Leg (104) contacts the outward side of belt (30) and leg (106) engages inward side of belt (30). A portion of belt (30) is sandwiched between lips (104) and (106). As previously indicated, stitches, rivets, internal grippers molded into the flexible rider, adhesives or any combination thereof can attach legs (104) and (106) to belt (30).

Rider or clip (100) includes slot (110) for receiving conveyor belt (30). Before belt (30) can abut end or stop (112) of slot (110), belt (30) is first threaded between lips (104) and (106). Depending upon the preferred embodiment practiced, stop (112) can be located in either convex head (102) or transitional body (108). Thus, end (112) and generally ellipsoidal shaped head (102) are positioned distal from the outward arc (32) of curved conveyor belt (30). As shown, lip (106) is of greater length than lip (104). However, lip (104) and (106) can be of identical or similar lengths. Importantly, as shown in Section A-A of FIG. 3, lip (106) has a set of teeth (120) incorporated thereon and integral therewith.

Figure 4:
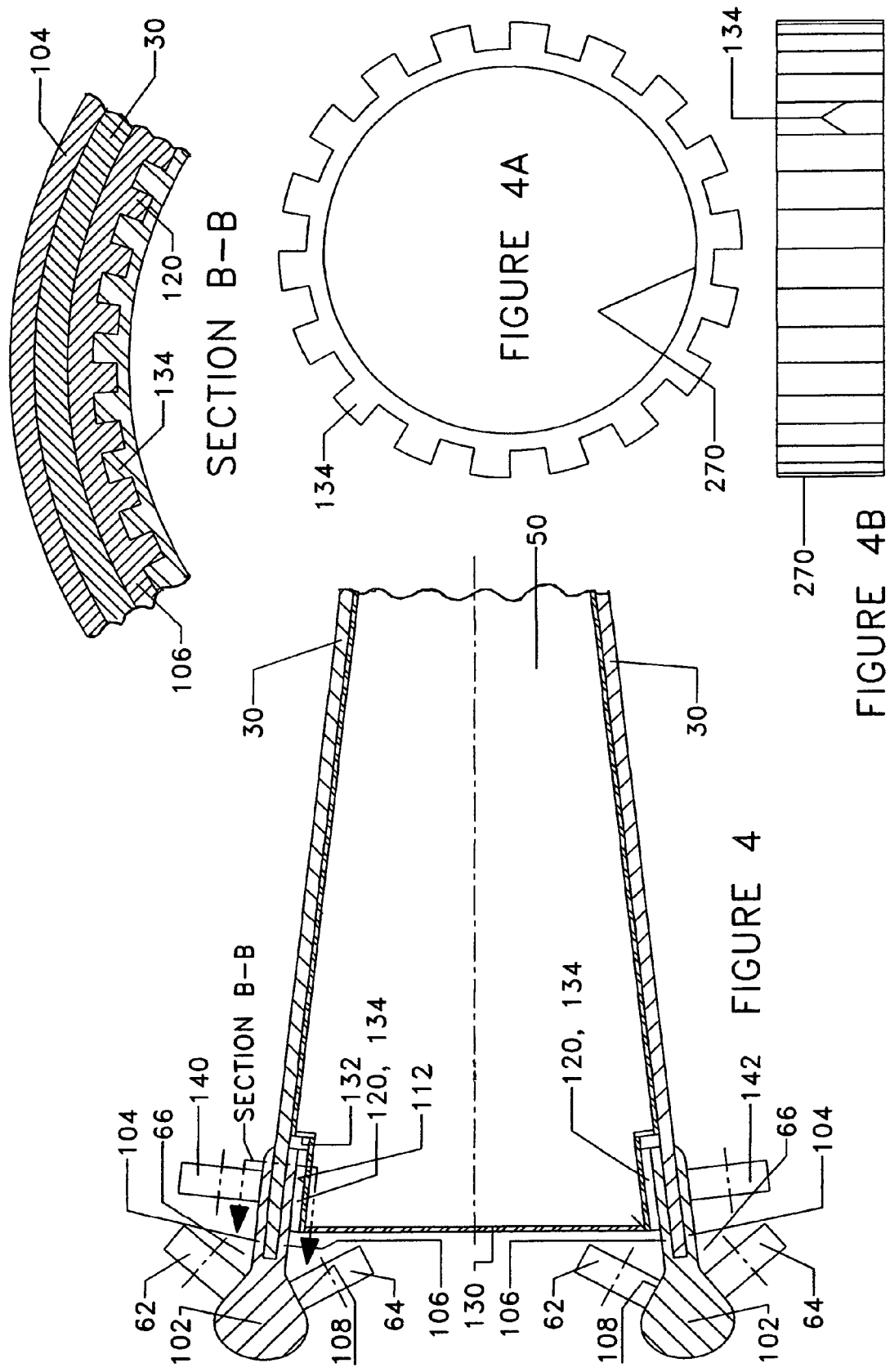
FIG. 4 is a close-up view of a portion of a drive pulley, within the scope of the present invention.

With reference to FIG. 4, conveyor belt (30) is driven about tapered driver (50). Tapered pulley (50) has recess (130) positioned near outward side (132) of driver (50). As shown with particularity in Section B-B of FIG. 4, a set of teeth (134) are formed in recess (130) for meshing with teeth (120) of lip (106). However, those skilled in the art recognize that in another embodiment, when driver (50) is not manufactured with teeth (134) in recess (130), a ring of teeth (270), such as that shown in FIGS. 4A and 4B, can be fitted over recess (130) to mesh with teeth (120) of lip (106).

Rotable bearings (140) and (142) ensure teeth (120) of lip (106) mesh with teeth (134). In select embodiments, both teeth (120) and a part of inner side (112) of lip (106) ride in recess (130) of driver (50). Upper rotable bearing (62) and lower rotable bearing (64) of holder (60) engage transitional body (108) of interlocker (100). Transitional body (108) is gripped tautly by rotable bearings (62) and (64) of holder (60), but belt (30) sandwiched between lips (104) and (106) can ride freely through passage (66). Due to the meshing of teeth (120) and teeth (134), when rotable driver (50) rotates, belt (30) is pulled about conveyor and belt (30) and lips (104) and (106) ride through passage (66) of holder (60), while transitional body (108) rides against rotable bearings (62) and (64).

Figure 5:
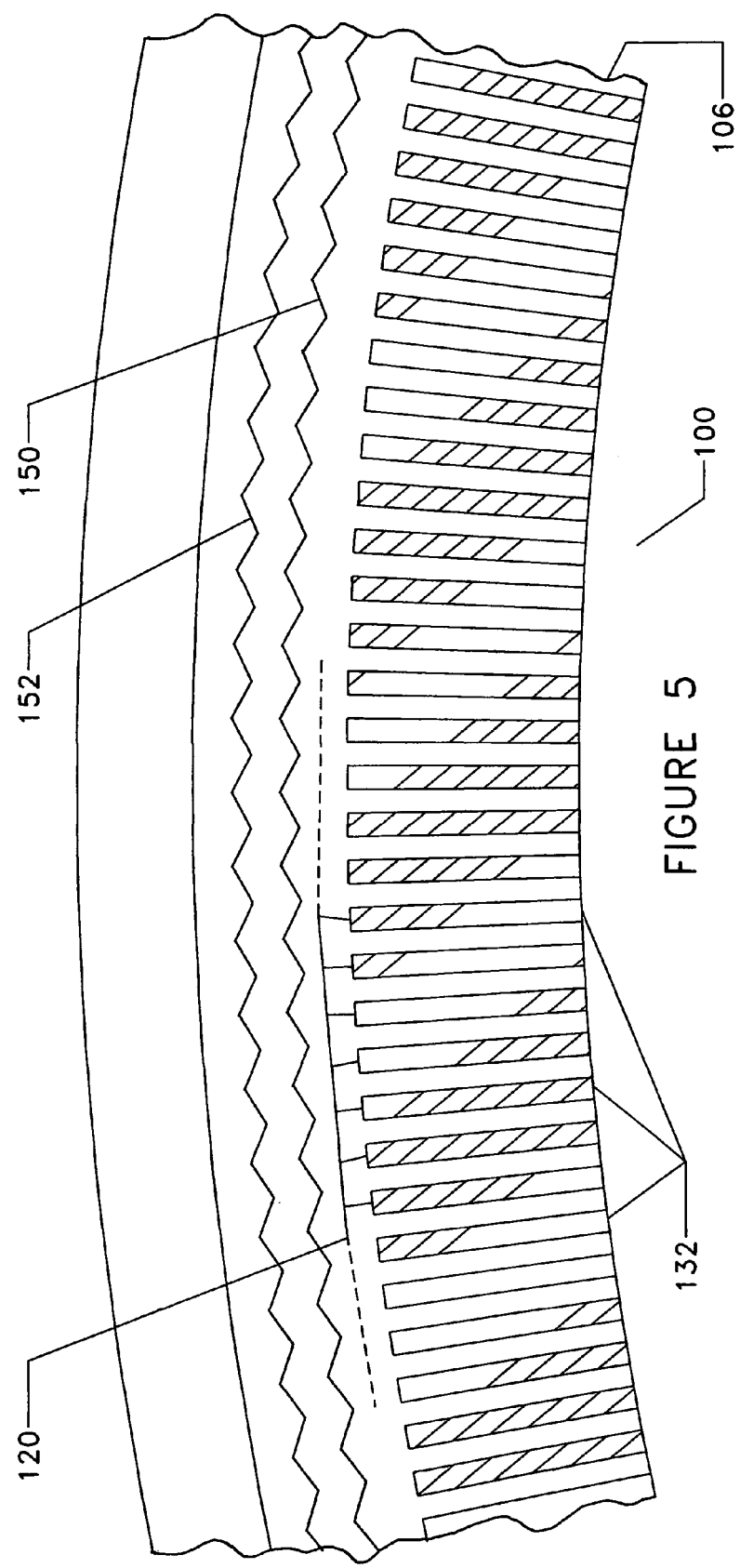
FIG. 5 is a view looking outward from the teeth of driver toward the inward side of lip of the interlocker.

FIG. 5 is a view looking outward from teeth (134) of driver (50) toward the inward side of lip (106) of interlocker (100). Interlocker (100) has a plurality of substantially parallel ridges or teeth (120) for meshing with the pulley's teeth (134). Of course, those skilled in the art recognize that depending upon the teeth (134) associated with driver (50), the rider's teeth (120), other than substantially parallel ridges, can be integrally formed on the inward side of leg (106). As shown, two rows of stitching (150) and (152) attach lip (106) to the conveyor belt (not shown). And in this embodiment, lip (106) is integrally formed with generally ellipsoidal shaped head (102) of rider (100).

Figure 6:
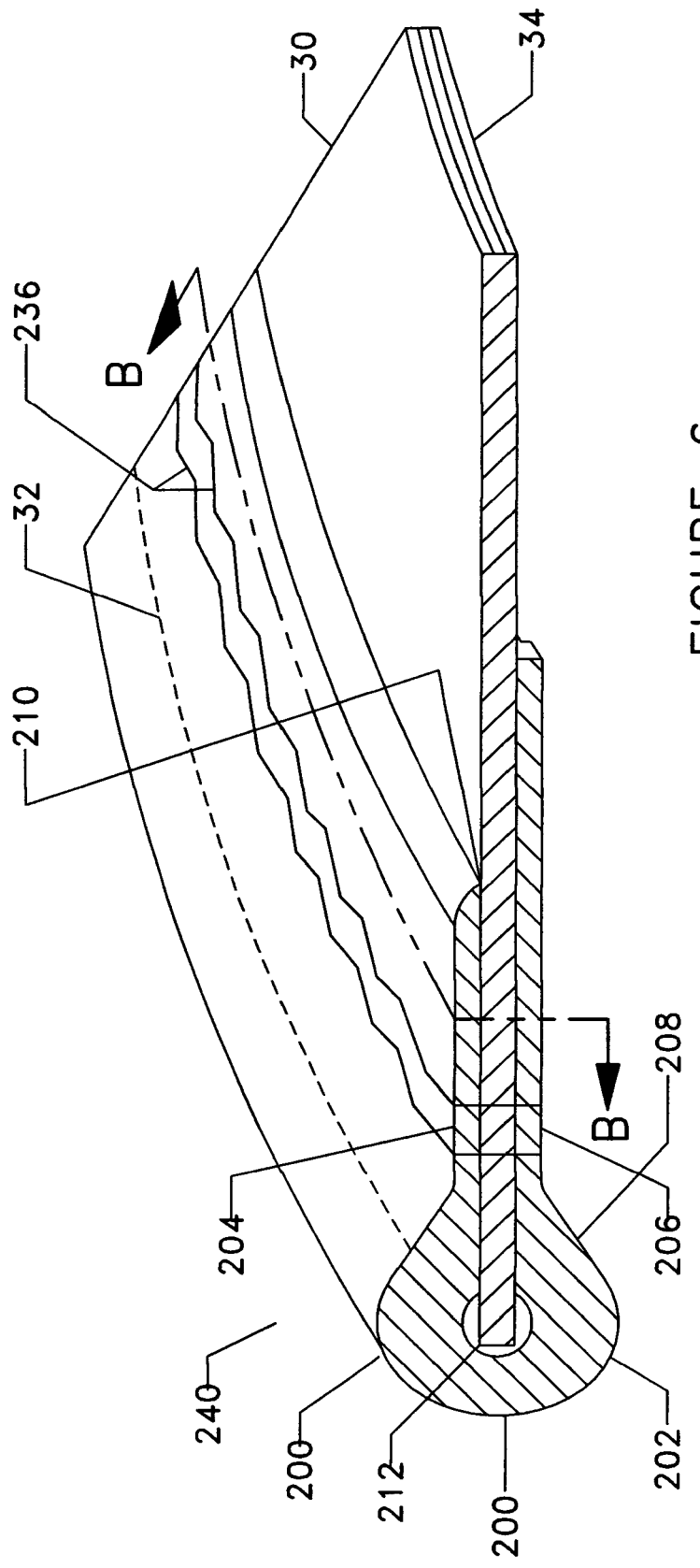
FIG. 6 is a cross-sectional view an embodiment of a beading and a conveyor belt, within the scope of the present invention.

FIG. 6 is a cross-section of conveyor belt (30) showing flexible interlocker or flexible beading (200) receiving a portion of belt (30). Although not shown in this view, without departing from the scope of the present invention, when engineering parameters mandate, flexible beading (200) can also be utilized with a straight conveyor belt. As portrayed in FIG. 6, conveyor belt (30) has outward arc (32) and inward arc (34). Flexible beading (200) is connected to belt (30) with threads or stitches (236). However, other means for connecting interlocker (200) and belt (30) can include rivets, internal grippers molded into the flexible beading, adhesives or any combination thereof.

In one embodiment of the current invention, flexible beading (200) can be described as an integrally formed clip. Extending from generally ellipsoidal shaped or convex head (202) is lip or leg (204) and lip or leg (206). In select embodiments, clip (200) can be provided with transitional body (208) formed between head (202) and legs (204) and (206). As with other embodiments, lips (204) and (206) are dimensioned to ride through a passage, e.g., passage (66) between upper rotable bearing (62) and lower rotable bearing (64) shown in FIG. 4.

As with interlocker (100) depicted in FIG. 4, in this alternative embodiment, flexible beading (200) has head (202) of large enough dimension such that head (202) is prevented from riding through passage (66). By way of illustration, convex or generally ellipsoidal shaped head (202) can ride against upper rotable bearing (62) and lower rotable bearing (64) portrayed in FIG. 4. Leg (204) contacts the outward side of belt (30) and leg (206) engages inward side of belt (30). A portion of belt (30) is sandwiched between lips (204) and (206). As previously indicated, stitches, rivets, internal grippers molded into the flexible beading, adhesives or any combination thereof can attach legs (204) and (206) to belt (30).

Flexible beading or clip (200) includes slot (210) for receiving conveyor belt (30). Before belt (30) can abut end or stop (212) of slot (210), belt (30) is first threaded between lips (204) and (206). Depending upon the preferred embodiment practiced, stop (212) can be located in either convex head (202) or transitional body (208). Thus, end (212) and generally ellipsoidal shaped head (202) are positioned distal from the outward arc (32) of curved conveyor belt (30). As shown, lip (206) is of greater length than lip (204). However, lip (204) and (206) can be of identical or similar lengths. Belt (30) is driven in forward or rearward directions by any gripping drive acceptable in the art.

The heads, transitional bodies and lips or legs of flexible beading (200) can be integrally formed and composed of a uniform composition. However, when engineering parameters require the heads, transitional bodies and lips or legs of flexible beading (200) can be manufactured from one or more blends of chemical compounds. By way of illustration and not limitation, the head can be composed of a first blend while the transitional body and legs are composed of a second blend, or the head can be composed of a first blend, the transitional body can be composed of a second blend and the lips composed of a third blend.

Prior to the present invention, it is believed unreinforced thermoplastic polyurethane beadings were the standard beadings connected to the edges of conveyor belts. Over time, use of the standard beadings showed that the stresses applied to the unreinforced polyurethane beadings caused the beadings to exceed their useful lives before the conveyor belt exceeded its useful life. In view of this problem, Applicants have unexpectedly discovered that their blended thermoplastic compositions increase the durability of interlockers or beadings while simultaneously maintaining the necessary flexibility required for beadings. Within the ambit of Applicants' invention, preferred embodiments include flexible beadings that include polyurethane and aramid fibers dispersed in the polyurethane.

Blended compositions for flexible beadings include from about 1% w/w to about 3% w/w aramid fibers dispersed in a polyether-based thermoplastic polyurethane. The more preferred embodiments have about 2% w/w of aramid fibers dispersed in the polyether-based thermoplastic polyurethane. In still another preferred embodiment, polyparaphenylene terphthalamide fibers are randomly dispersed and embedded in the polyether-based thermoplastic polyurethane. After experimentation, it was determined that the dispersion of from about 1% w/w to about 3% w/w aramid fibers in a polyether-based thermoplastic polyurethane created beadings with the necessary tensile strength and durometer to improve interlocker longevity over the prior art's unreinforced polyurethane beadings while simultaneously producing beadings of sufficient flexibility to readily circulate through the conveyor system.

In accordance with the present invention, aramid fibers have diameters from about 10 micrometers to about 14 micrometers and lengths from about 3 millimeters to about 7 millimeters. It has unexpectedly been determined that aramid fibers with diameters of about 9 micrometers to about 13 micrometers and with lengths of about 4 millimeters to about 6 millimeters create the most cost-efficient durable and flexible beadings within the scope of the present invention.

Testing of the above identified blended compositions has revealed that flexible beadings of the current invention have:
1) a Shore A hardness of from about 85 to about 90;
2) a tear strength of about 2400 Newtons or greater;
3) a tensile strength of about 30 Newtons per square millimeter or greater; and
4) a specific gravity of about 1.07 to about 1.11.

Having disclosed the invention as required by Title 35 of the United States Code, Applicant now prays respectfully that Letters Patent be granted for his invention in accordance with the scope of the claims appended hereto.

What is claimed is:

1. An interlocker attached to an outer margin of a conveyor belt, comprising:
   a) a flexible beading integrally formed with a head, a first lip and a second lip such that said head surrounds said outer margin of said conveyor belt, wherein said flexible beading comprises a composition distinct from said conveyor belt's composition, and wherein said flexible beading's composition further comprises:
      i) from about 97% w/w to about 98% w/w polyether-based thermoplastic polyurethane;
      ii) from about 1% w/w to about 3% w/w polyparaphenylene terphthalamide fibers randomly dispersed and embedded in said polyether-based thermoplastic polyurethane, wherein said polyparaphenylene terphthalamide fibers have diameters from about 10 micrometers to about 14 micrometers and lengths from about 3 millimeters to about 7 millimeters;
      iii) a tensile strength of about 30 Newtons per square millimeter or greater;
      iv) a tear strength of about 2400 Newtons or greater; and
      v) a Shore A hardness of from about 85 to about 90; and
   b) at least one of said first lip or said second lip comprising teeth for meshing with a driver.

2. The invention of claim 1, wherein said flexible beading further comprises a specific gravity of from about 1.07 to about 1.11.

3. The invention of claim 2, wherein said flexible beading further comprises a generally ellipsoidal shaped head.

4. The invention of claim 3, wherein said flexible beading further comprises a transitional body.

5. The invention of claim 4 wherein said transitional body is tapered.

6. A beading extending outward from an outward arc of a curved conveyor belt, comprising:
   a) a generally ellipsoidal shaped head;
   b) a first leg;
   c) a second leg spaced apart from said first leg; and
   d) a tapered transitional body, extending between said generally ellipsoidal shaped head and said first leg and said second leg, wherein one or more of said generally ellipsoidal shaped head's, said first leg's, said second leg's or said transitional body's compositions comprises:
      i) from about 97% w/w to about 98% w/w polyether-based thermoplastic polyurethane;
      ii) from about 1% w/w to about 3% w/w aramid fibers randomly dispersed and embedded in said polyether-based thermoplastic polyurethane;
      iii) a Shore A hardness of from about 85 to about 90; and
      iv) a specific gravity of from about 1.07 to about 1.11.

7. The invention of claim 6 wherein said transitional body comprises a greater circumference proximate said generally ellipsoidal shaped head than proximate said outward border of said conveyor belt.

8. The invention of claim 7 wherein said aramid fibers are randomly dispersed in said polyether-based thermoplastic polyurethane and have:
   a) diameters from about 10 micrometers to about 14 micrometers; and
   b) lengths from about 3 millimeters to about 7 millimeters.

9. The invention of claim 8 wherein at least one of said first leg or said second leg comprises a plurality of teeth raised on a side for meshing with a drive.

10. The invention of claim 9 wherein at least one said generally ellipsoidal shaped head, said first leg, said second leg or said transitional body compositions comprises:
    a) a tensile strength of about 30 Newtons per square millimeter or greater; and
    b) a tear strength of about 2400 Newtons or greater.

11. The invention of claim 10, wherein said aramid fibers comprise polyparaphenylene terphthalamide.

12. A beading attached to an endless loop conveyor belt, comprising:
    a) a head;
    b) a first leg;
    c) a second leg; and
    d) a transitional body extending between said head and said first leg and said second leg, wherein at least one of said head's, said first leg's, said second leg's or said transitional body's compositions comprises:
       i) from about 97% w/w to about 98% w/w polyether-based thermoplastic polyurethane;
       ii) from about 1% w/w to about 3% w/w aramid fibers randomly dispersed and embedded in said polyether-based thermoplastic polyurethane; and
       iii) a Shore A hardness of from about 85 to about 90.

13. The invention of claim 12 wherein said aramid fibers are randomly dispersed in said polyether-based thermoplastic polyurethane and are:
    a) from about 10 micrometers to about 14 micrometers in diameter; and b) from about 3 millimeters to about 7 millimeters in length.

14. The invention of claim 13, wherein said aramid fibers comprise polyparaphenylene terphthalamide.

15. The invention of claim 14 wherein at least one of said first leg or said second leg comprises a plurality of teeth raised on a side for meshing with a drive.

16. The invention of claim 15, wherein at least one of said head's, said first leg's, said second leg's or said transitional body's compositions further comprises:
   a) a specific gravity of from about 1.07 to about 1.11;
   b) a tensile strength of about 30 Newtons per square millimeter or greater; and
   c) a tear strength of about 2400 Newtons or greater.

17. A beading attached to a margin of a conveyor belt, comprising:
   i) from about 97% w/w to about 98% w/w polyether-based thermoplastic polyurethane;
   ii) from about 1% w/w to about 3% w/w aramid fibers embedded in said polyether-based thermoplastic polyurethane; and
   iii) a Shore A hardness of from about 85 to about 90.

18. The invention of claim 17, wherein said aramid fibers comprise polyparaphenylene terphthalamide.

19. The invention of claim 18 further comprising a lip including teeth for meshing with a driver.

20. The invention of claim 19, wherein rider's composition further comprises:
   a) a specific gravity of from about 1.07 to about 1.11;
   b) a tensile strength of about 30 Newtons per square millimeter or greater; and
   c) a tear strength of about 2400 Newtons or greater.

* * * * *